United States Patent [19]

Mattusch

[11] Patent Number: 4,832,418
[45] Date of Patent: May 23, 1989

[54] ANTI-LOCK HYDRAULIC BRAKE SYSTEM FOR AUTOMOTIVE VEHICLES

[75] Inventor: Franz J. Mattusch, Bad Homburg, Fed. Rep. of Germany

[73] Assignee: Alfred Teves GmbH, Frankfurt am Main, Fed. Rep. of Germany

[21] Appl. No.: 174,067

[22] Filed: Mar. 28, 1988

[30] Foreign Application Priority Data

Apr. 1, 1987 [DE] Fed. Rep. of Germany ....... 3710886
Sep. 5, 1987 [DE] Fed. Rep. of Germany ....... 3729787

[51] Int. Cl.$^4$ .............................................. B60T 8/88
[52] U.S. Cl. ..................................... 303/114; 303/92
[58] Field of Search ................... 303/92, 93, 100, 110, 303/111, 114, 116, 119

[56] References Cited

U.S. PATENT DOCUMENTS

| | | | |
|---|---|---|---|
| 4,662,687 | 5/1987 | Leiber | 303/110 |
| 4,682,824 | 7/1987 | Burgdorf et al. | 303/92 |
| 4,728,156 | 3/1988 | Burgdorf et al. | 303/92 |

Primary Examiner—Duane A. Reger
Attorney, Agent, or Firm—James B. Raden

[57] ABSTRACT

In a slip-controlled brake systems which provide for a hydraulic resetting of the brake pedal in the event of slip control, it must be ensured that the change-over valves which check the connection between resetting chamber and compensating reservoir are open in their initial position. Otherwise brake application is blocked. In the disclosed anti-lock brake system, the actually developing pressure or fluid flow is compared by a pressure sensor or flow sensors during a test cycle with the pressure or flow to be expected when the valves are open.

6 Claims, 4 Drawing Sheets

ANTI-LOCK HYDRAULIC BRAKE SYSTEM FOR AUTOMOTIVE VEHICLES

BACKGROUND OF THE INVENTION

An anti-lock hydraulic brake system for an automotive vehicle with a master brake cylinder to which wheel brake cylinders are connected by way of one or more brake lines. A pedal-operated power booster is fed by a pressure fluid source and is inserted upstream of the master brake cylinder. The system includes a booster piston one end face of which confines a resetting chamber and the other end face thereof confines a booster chamber. The resetting chamber communicates with the booster chamber by way of a normally closed change-over valve which is closed in the de-energized state. The chamber further communicates with an unpressurized compensating reservoir by way of one or more parallel connected, normally open change-over valves which are opened in the de-energized state.

A brake system of this type is known which, for slip control, controls the braking pressure by way of the time-multiplex method, (German published patent application No. 33 17 629). For this purpose, electromagnetically actuatable multidirectional control valves are inserted into the pressure-fluid conduits connecting the wheel brakes individually and/or in pairs to the braking pressure generator, the valves open or close the pressure-fluid passage. Further, control valves produce an auxiliary force which counteracts the pedal force and which for slip control reduces the force applied on the pistons in the master brake cylinder and thus the braking pressure generated in the master brake cylinder. when all wheels run stably, all wheel valves. inserted between the braking pressure generator and the wheel brakes are switched to open passage and thus communicate with the master brake cylinder. In the event of an imminent locked condition at any one of the wheels, the wheel valves leading to the other wheels will be changed over to close for a short time so that only the pressure-fluid circuit of the imminently locking wheel remains connected to the master brake cylinder. An auxiliary force is built up which compensates the (auxiliary-force-assisted) brake-pedal pressure partially or completely, whereby the braking pressure is reduced at the imminently locking wheel which is the sole one connected. The pressure remains constant in this phase in the other wheels. After the pressure has been reduced and the pressure level desired is attained, the reduced pressure at that wheel which became unstable at first will be maintained constant by a valve change-over. After the decrease of the counter force and the renewed pressure development in the master brake cylinder the braking pressure build-up is continued in the other wheel brakes. This way the braking pressure at each wheel successively can be set to the desired value calculated by the associated electronics.

To generate an auxiliary force counteracting the pedal force, the booster piston confines a resetting chamber which is diminished upon brake application. In the absence of brake slip control, this resetting chamber communicates with the unpressurized compensating reservoir by way of open change-over valves. Thus, the volume contained in the resetting chamber can be supplied into the compensating reservoir without any effort. In case it becomes necessary to reset the booster piston because of a brake slip control action, the resetting chamber is furnished with pressurized pressure fluid by switching the normally closed change-over valve. To achieve this, the resetting chamber can be in direct communication with the pressure fluid source and, on the other hand, with the booster chamber of the brake power booster. Alternatively, the pressure of the pressure fluid is conformed to the pedal force so that the pedal resetting will not occur abruptly as in the first instance. The present invention is directed to this alternative case.

This arrangement is disadvantageous. Namely, if the change-over valves which establish the connection to the compensating reservoir are not able to re-assume their open position after a resetting action, for example, because one valve part is jammed, then the resetting chamber is locked hydraulically. As a result, the booster piston is not able to move and no braking effect can be exerted any longer. To avoid this it has been proposed to connect several change-over valves in parallel so that at least one change-over valve will re-open and that thus the connection to the compensating reservoir is maintained. This means that the system is redundant. It may occur, however, that one or more of the valves becomes jammed so that the system is no longer redundant. This defect cannot be recognized easily, since the still intact valve provides full readiness for use. The previously known means do not permit detection of whether one of the valves has failed and thus a redundant system is not provided. If subsequently the second valve also fails, this will occur without warning, and the driver will be confronted with an unbrakable vehicle. It is therefore an object of the present invention to create a system which checks the switch condition and the operability of the valves. This affords the possibility of issuing a corresponding alarm signal to the driver upon failure of a valve.

SUMMARY OF THE INVENTION

This object is achieved in that the resetting chamber is connected by way of a connecting valve to the pressure fluid source, and in that a pressure sensor is connected to the resetting chamber. A test cycle provides a control unit that closes the change-over valves SO in the line leading to the compensating reservoir, and a connection is established to the pressure fluid source. The result being that pressure builds up in the resetting chamber that is ascertained by the pressure sensor. If the control unit closes the connection to the pressure fluid source and re-opens the change-over valves SO, a pressure decrease will take place which is also recognized by the pressure sensor. Pressure build-up and decrease during the test cycle is then interpreted to imply that the change-over valves SD are in their open position and are operable.

The supply of pressure fluid to the resetting chamber for a test cycle can be done in two ways. First, inserted into the pressure fluid connection from the booster chamber to the change-over valve SG is a non-return valve closing toward the booster chamber, and terminating into the pressure fluid connection between the non-return valve and the change-over valve SG is a pressure line to the pressure fluid source. A connecting valve is inserted into the pressure fluid line. The second method provides that there is an additional pressure fluid connection between the resetting chamber and the pressure fluid source in which a connecting valve is arranged. If there are two parallel connected change-over valves SO, these could also be checked one after the other, which would detect which one of the parallel connected valves is defective. For this purpose, first, both valves are closed, and pressure build-up is caused in the resetting chamber. The valve to be checked is opened, and it is observed whether pressure decrease takes place In another solution flow sensors are arranged in the parallel branches of the line to the compensating reservoir. The test cycle provides a pressure fluid flow from the pressure fluid source to the compensating reservoir. This pressure fluid flow is recognized by the flow sensors, but only if the change-over valves SD are in their opened positions. This version does not check the operability of the valves, and it cannot be determined whether the valves are able to close.

The present invention permits various switching possibilities. In one embodiment the resetting chamber is connected directly to the pressure fluid source during a brake slip control action. Preferred embodiments include both test alternatives, that is by a pressure sensor or flow sensors.

DETAILED DESCRIPTION OF A PREFERRED EMBODIMENT

Figure 1:
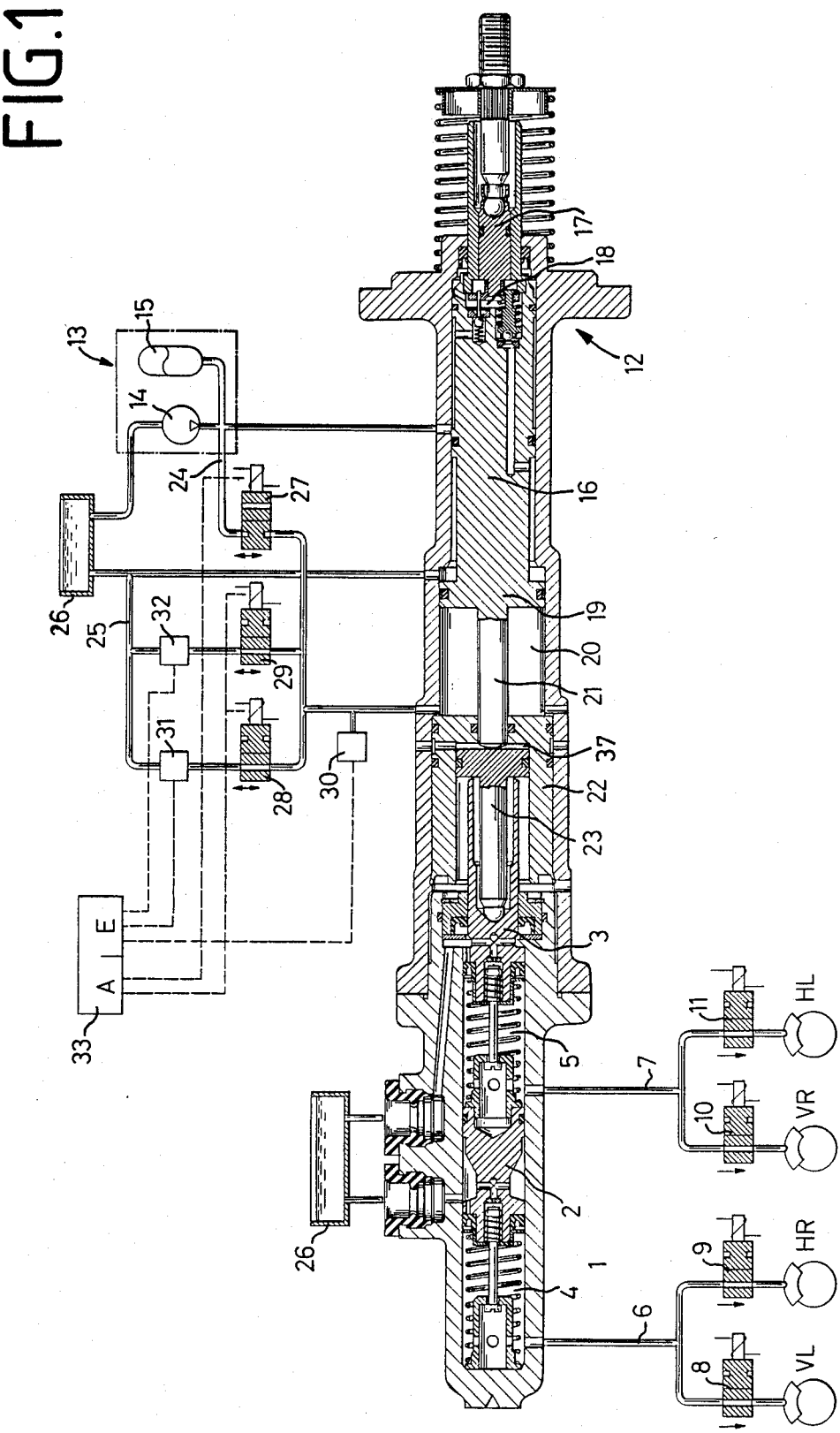
FIG. 1 is a longitudinal cross-section through a master cylinder and a booster inserted upstream thereof wherein the resetting chamber 20 is in direct communication with the pressure fluid source 13 by way of a valve 27.
Figure 2:
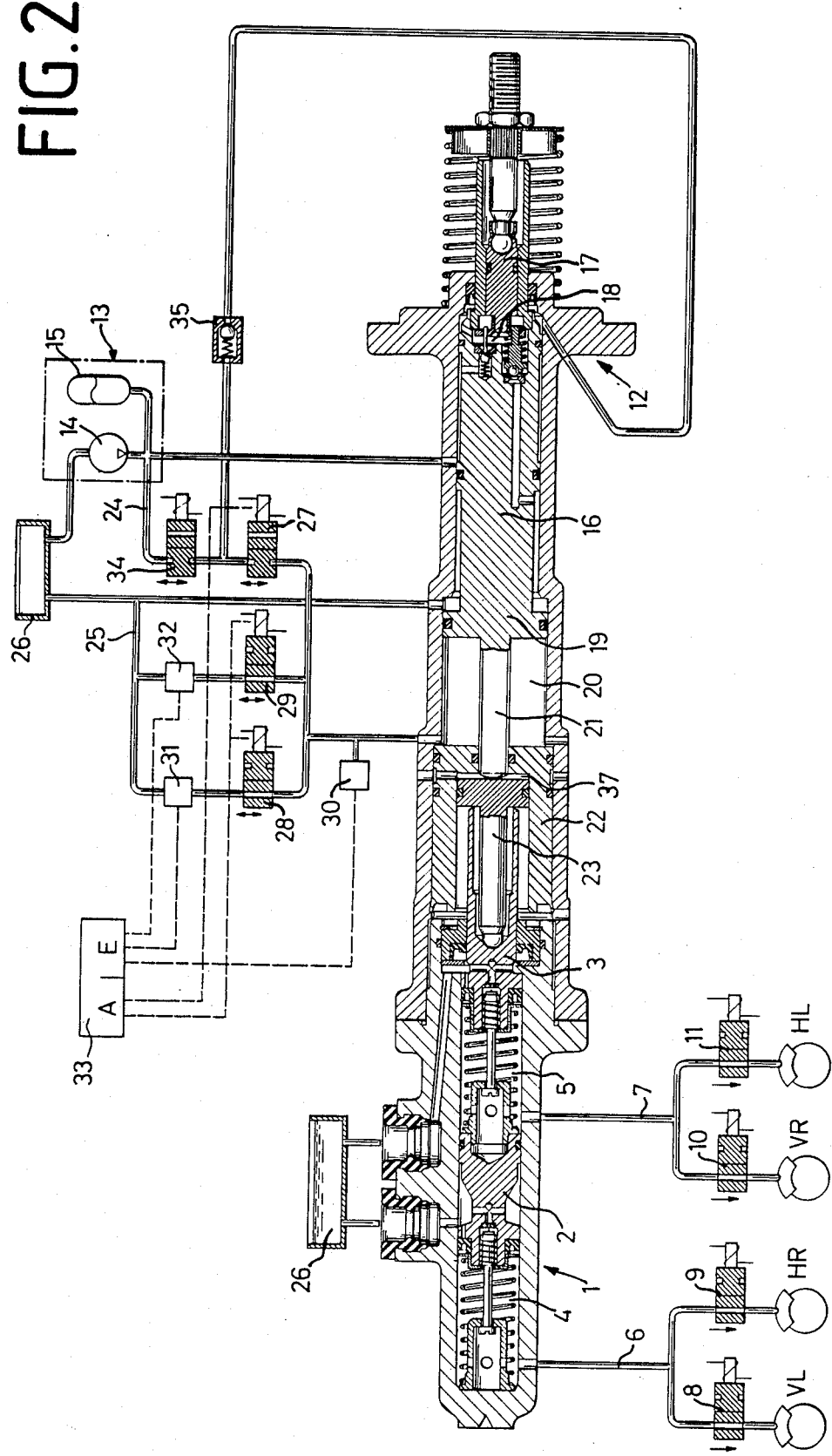
FIG. 2 is a view similar to FIG. 1 wherein the resetting chamber 20 is in connection with the booster chamber 18 by way of the valve 27 and a non-return valve 35. To initiate the test cycle, the pressure fluid source 13 is connected by means of the valve 34, and the pressure fluid line 24 terminates into the line between the valve 27 and the non-return valve 35.
Figure 3:
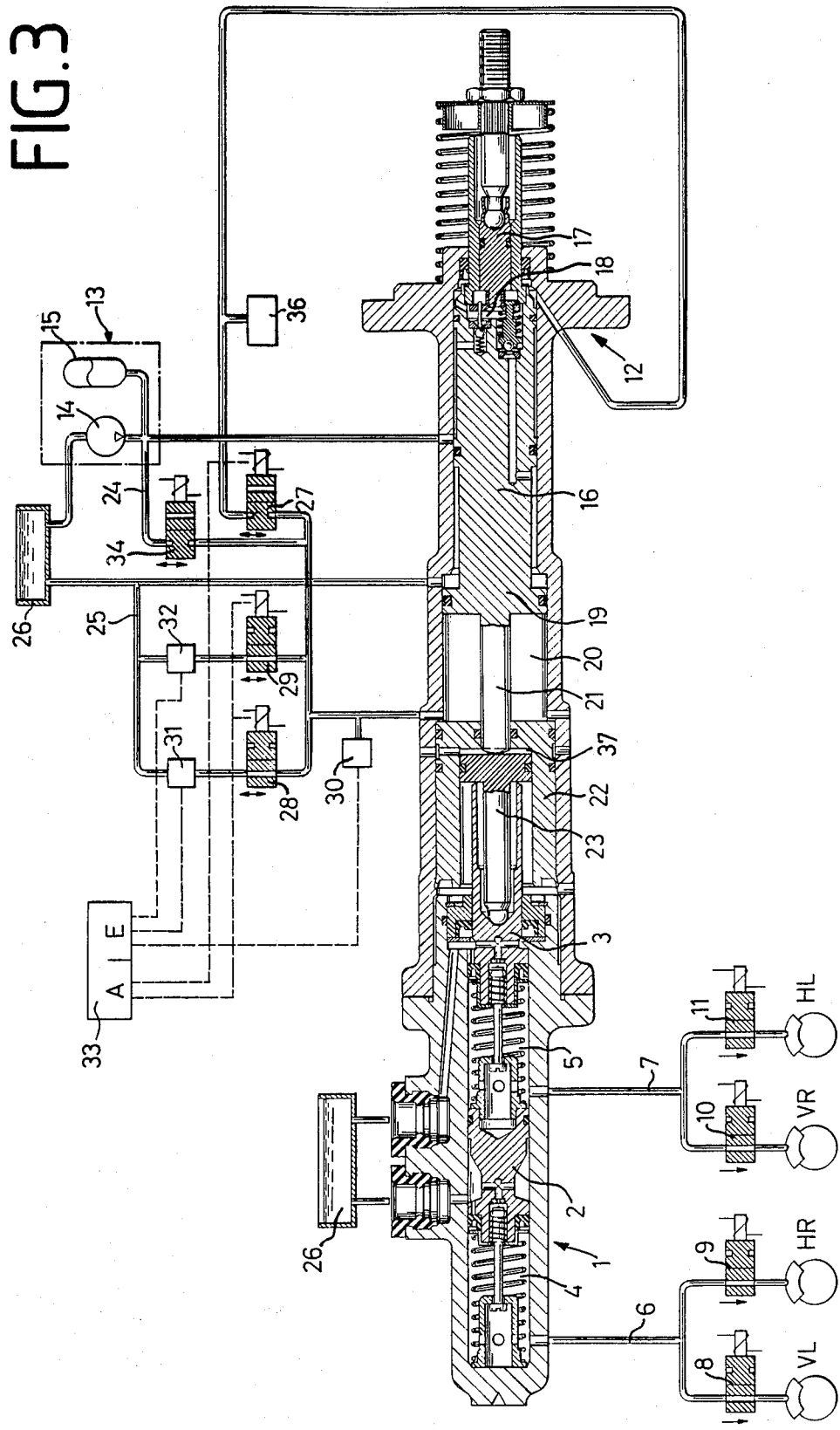
FIG. 3 is another view wherein the pressure fluid source is connected directly to the resetting chamber 20 by way of valve 34. Valve 34 is illustrated opened for pressurization of the resetting chamber 20; and, FIG. 4 is a diagram which shows the principal course of a test cycle by way of a flowchart.

In the embodiment according to FIG. 1, the resetting chamber 20 is acted upon directly by the pressure out of the pressure fluid source during a brake slip control action. In FIGS. 2 and 3 for resetting the booster piston during a brake slip control action the connection is established between the resetting chamber 20 and the booster chamber 18. Since the test cycle is initiated when the brake is not applied, no pressure is available in the booster chamber 18 so that the pressure fluid source 13 must be connected in order to initiate the test cycle. This is effected by means of the valve 34 which either establishes a direct pressure fluid connection to the resetting chamber 20 (FIG. 3) or connects the pressure fluid source 13 instead of the booster chamber 18 to the valve 27, a reaction on the booster chamber 18 caused by the non-return valve 35 thereby being avoided.

The master brake cylinder 1 includes two pistons 2, 3 guided in a bore. The floating piston 2 confines a working chamber 4, and the push-rod piston 3 confines another working chamber 5, working chamber 4 is connected by way of a pressure fluid line 6 to the left front wheel brake VL and the right rear wheel brake HR. Working chamber 5 communicates by way of a pressure fluid line 7 to the right front wheel brake VR and the left rear wheel brake HL. Allocated to the wheel brake cylinders are two-way/two-position directional control valves 8, 9, 10, 11 which are driven electromagnetically. Inserted upstream of the master brake cylinder 1 is a booster 12 which is supplied by a pressure fluid source 13. Pressure fluid source 13 comprises of a pump 14 and an accumulator 15.

The booster incorporates a booster piston 16 comprising control valves which are actuated by the control piston 17. The valves influence the connection of the booster chamber 18 to the pressure fluid source 13 and the compensating reservoir 26 such that a specific pressure develops in the booster chamber 18 which in general is proportional to the pedal force. The booster piston 16 passes over into a resetting piston 19 which confines the resetting chamber 20 with its end face remote from the control piston 17. Succeeding the end face of the resetting piston is a tappet 21 which extends through a wall 22 in a pressure-fluid tight fashion and which acts upon the push-rod piston 3 by way of an intermediate piston 23. The resetting chamber 20 communicates by way of a pressure fluid line 24 with the pressure fluid source 13 or with the booster chamber 18 and connects by way of a pressure fluid line 25 to the compensating reservoir 26.

Inserted into the pressure fluid line 24 is a change-over valve 27 which is normally closed. In the pressure fluid line 25 leading to the compensating reservoir 26, two change-over valves 28, 29 are connected in parallel which are normally open.

In order to monitor the valves, either a pressure switch 30 which is adjacent to the resetting chamber, or flow sensors 31, 32 which are placed in the parallel branches of line 25. The sensors 31, 32 are connected to the input E of a control unit 33 by way of signal lines. The valves 27, 28, 29 are connected to the output A of control unit 33 by way of control lines.

The brake system operation is as follows: By actuation of the control piston 17, pressure fluid out of the pressure fluid source 13 is metered into the booster chamber 18. The booster pressure develops proportionally to the actuating force. The pressure developing in the booster chamber 18 causes displacement of the booster piston 16. This movement is transmitted by means of the tappet 21 and the intermediate piston 23 onto the push-rod piston 3 of the master cylinder 1. The pressure fluid in the working chamber 5 is compressed so that a corresponding movement of the floating piston 2 will follow until a balance of pressure between the working chambers 4, 5 is achieved. The pressure in the working chambers is transmitted by way of the brake lines 6, 7 to the wheel brakes. If an imminent locked condition of one of the wheels is detected by sensors (not shown), first the two-way/two-position directional control valves of the other wheels will assume their closed position.

In another step, the change-over valves 27, 28, 29 are switched over so that the resetting chamber 20 is connected to the pressure fluid source. Since the resetting piston 19 has a larger diameter than the booster piston 16, resetting of the booster piston 16 will take place. The push-rod piston 3 is no longer loaded, and pressure relief results in the working chambers 4, 5 which is transmitted onto the wheel cylinders of the locking wheel. The pressure in the remaining wheel cylinders remains constant, since the corresponding two-way/two-position directional control valves are in their closed positions. As the locking wheel is no longer exposed to brake forces, it will be accelerated and moved out of the incipient locked condition.

Renewed pressurization of the master brake cylinder may either be effected by pressure fluid being discharged from the resetting chamber 20 or, with the booster piston 16 reset, by pressure fluid being introduced into the modulation chamber 37 that confines the intermediate piston 23. The valves and control devices necessary therefor are not illustrated in the drawing since they are not part of this invention. As soon as the control action is concluded. the change-over valves 27, 28, 29 are switched to assume their original position. Upon renewed actuation of the booster piston 16, the resetting chamber 20 will be diminished, and pressure fluid will flow out of the resetting chamber 20 into the compensating reservoir 26.

As it is imperative for the functioning of the brake that the booster piston 16 is capable of shifting, it must be ensured that the change-over valves 28, 29 or at least one of them is in the opened position, since otherwise the pressure fluid is unable to be displaced out of the resetting chamber. Since the valves always are subject the risk that the closure member is jammed and, consequently, the valve remains in its closed position although the actuating signal is to switch it to the opened position, it is advantageous to provide for a checking mechanism so that an alarm signal can be issued in due time.

A first solution provides for a pressure switch 30 which records the pressure in the resetting chamber 20. The control unit 33 initiates a control cycle, and first the valves 28, 29 are switched to their closed position and, subsequently, the valve 27 is opened as illustrated in FIG. 1. According to FIG. 2, in addition, the valve 34 is switched over so that there is a pressure fluid connection between the pressure source 13 and the resetting chamber 20, with the valves 27 and 34 opened. According to FIG. 3, valve 34 is opened, and valve 27 remains in its closed position.

Subsequently, the accumulator pressure develops in the resetting chamber 20 which is recorded by the pressure sensor 30. When the valves re-assume their original positions, pressure decrease will take place, since pressure fluid in the resetting chamber 20 is discharged to the compensating reservoir 26. This can take place only if the valves 28, 29 actually change over so that the pressure build-up and pressure decrease in the resetting chamber 20 recorded by the control unit is interpreted during the test cycle as an implication that the valves B, 29 are in their opened position. To determine which one of the valves has not assumed its opened position, the test cycle may also be carried out several times, with only one change-over valve SO 27 or 28 being switched in each case.

Another alternative embodiment provides pressure flow sensors 31, 32 inserted into the parallel branches of the line 25. When valve 27 is opened according to this embodiment, pump 14 will deliver unpressurized fluid into the compensating reservoir 26. The other embodiment requires corresponding valve switching actions. When the valves 28, 29 are opened, a corresponding fluid flow is recorded at the flow sensors 31, 32 which will be terminated as soon as the valve 27 re-assumes its closed position. Since fluid flow is possible only if the valves 2B, 29 are open, the registered fluid flow can be interpreted to imply that these valves are in their opened positions. Should the control unit 33 not receive any signals from the sensors 31, 32 which can be expected according to the opened position of the valves 28, 29, then an alarm signal can be issued which informs the driver of this situation.

As is illustrated in FIG. 3, the pressure in the booster chamber 18 can be checked by means of a pressure sensor 36. If the brake is actuated during a test cycle, which has as a direct consequence pressure build-up in the booster chamber 18 which is detected by the pressure sensor 36. Pressure sensor 36 issues a signal to the control unit 3 which, subsequently, interrupts the test cycle at once so that the resetting chamber 20 becomes pressureless and the booster piston 16 can be displaced without resistance. Of course, this measure can be provided in the other embodiments as well.

Figure 4:
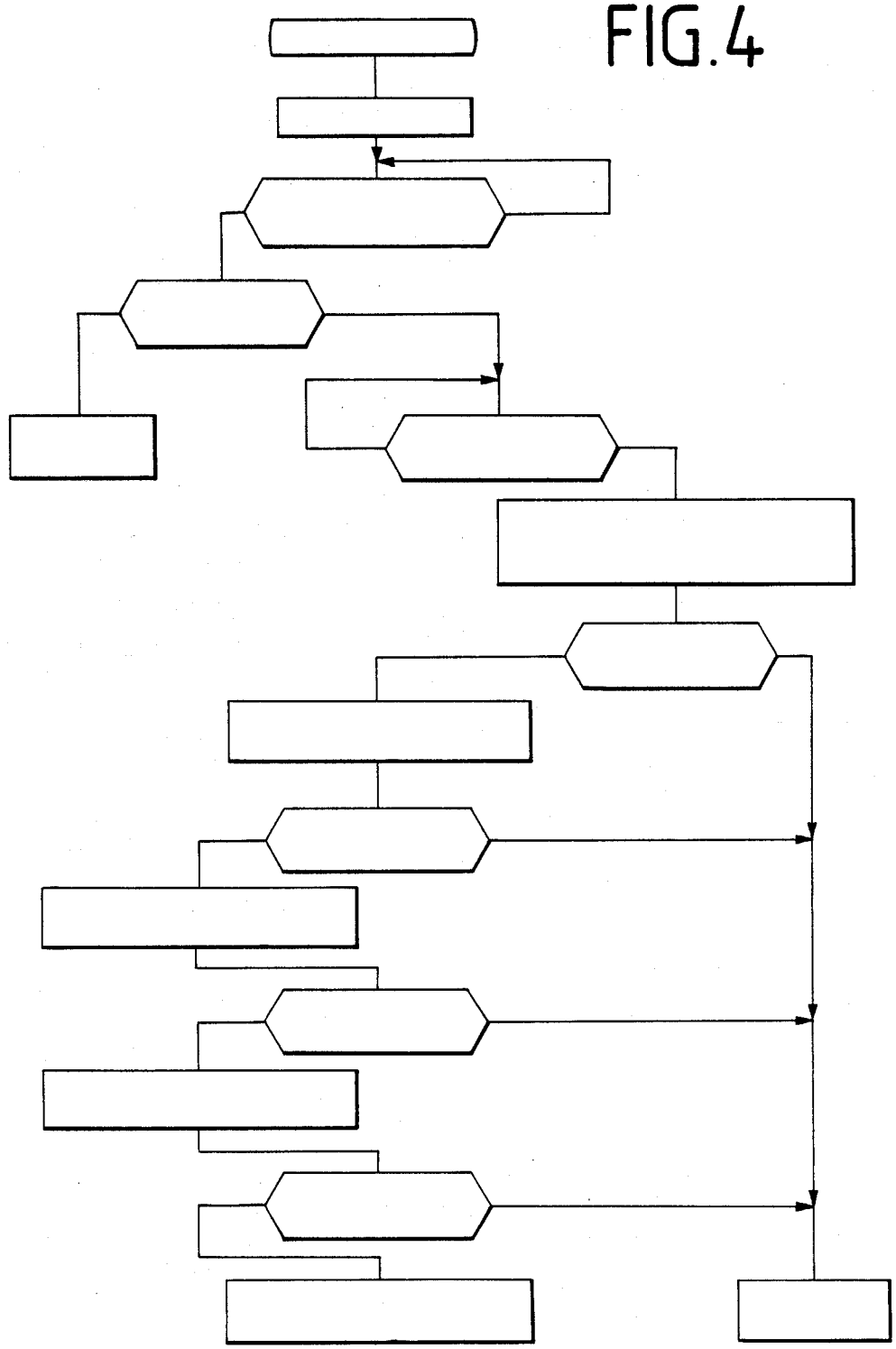

The mode of effect of the test circuit for the embodiment according to FIG. 1 is apparent from the flow-chart diagram illustrated in FIG. 4. The test cycle according to FIG. 4 can be easily adapted to the other embodiments. In the flowchart, the pressure sensor 30 is referred to as pressure switch: open pressure switch implies that there is absence of pressure.

The test cycle will commence (START) when the vehicle engine is started or on the occurrence of any other relatively frequently occurring condition or in regular intervals. Anti-lock control will be blocked (ABS blocked). If auxiliary pressure is present (central energy supply o.k.) and the pressure switch 30 is open (pressure switch closed: no) and if the brake is not applied at this point of time (brake applied: no), all valves associated with the resetting chamber will be energized and thus switched over. If the resetting unit is in order. This has as a result pressure development in the resetting chamber 20 and actuation of the pressure-measuring element and/or pressure switch 30 (pressure switch closed: yes). Subsequently, one of the valves 28 or 29 opening the pressure-fluid conduit toward the reservoir 26 and the valve 27 will be switched back by the test circuit by terminating the actuating signal (switch back SG-valve closed energized ). This has as a consequence a pressure reduction in the resetting chamber 20 and thereby opening of the pressure switch 30 (pressure switch opened: yes). Thereafter, again all switchable valves 28, 29 and 27 of the resetting unit will be actuated (actuate all valves of the resetting unit), and it will be checked whether the pressure switch 30 closes again properly (pressure switch closed: yes). Now it is merely required to switch back the second valve leading to the pressure-compensating reservoir 26 as well as the pressure-metering valve 27. If this causes opening of the pressure switch (pressure switch opened: yes), then the test cycle is completed because it has been determined that the resetting unit is in order (resetting unit o.k.), anti-lock control may not be activated. Moreover, the diagram illustrates that deviation from the described signal course indicates a defect or a malfunction which must be signalled. The described test cycle lends itself to logical combining with the aid of a hard-wired circuitry or by a corresponding program if the control unit 33 comprises programmed circuits such as microcomputers.

What is claimed is:

1. In an anti-lock braking system for an automotive vehicle including booster piston means for applying pressure to the hydraulic brake actuators at each wheel of the vehicle, anti-lock control means for reducing the pressure applied by said booster piston means to the brake actuator of an individual wheel by resetting said booster piston means in response to an anticipated locking of said wheel, said booster piston means including a booster piston having opposed end faces respectively exposed to a booster chamber and to a resetting chamber, first conduit means connected between said booster chamber and a source of fluid under pressure, second conduit means connected between said booster chamber and an unpressurized fluid reservoir, first normally closed, two-position valve means operable when in a normally closed position to block flow of fluid through said first conduit means and actuable to an open position connecting said source to said resetting chamber via said first conduit means, and second normally open, two-position valve means operable when in a normally open position to connect said resetting chamber to said reservoir via said second conduit means and actuable to a closed position wherein flow through said second conduit means is blocked;

the improvement wherein said control means includes test means for verifying the operability of said second valve means, said test means comprising means in said control means operable to shift said first and said second valve means in a predetermined test cycle between their respective open and closed positions, and comparison means for comparing the actual pressures in said resetting chamber during said test cycle with the theoretical pressures which should occur in said resetting chamber in response to the cyclic opening and closing of said first and second valve means and for generating a warning signal in response to a discrepancy between said actual and theoretical pressure variations.

2. The invention defined in claim 1 further comprising a branch conduit in said first conduit means directly connecting said source to said booster chamber.

3. The invention defined in claim 2 further comprising a one-way check valve in said branch conduit oriented to accommodate flow only from said booster chamber toward said source.

4. The invention defined in claim 1 wherein said control means includes means responsive to the starting of the engine of said vehicle for initiating a test cycle of said test means.

5. The invention defined in claim 1 comprising means responsive to a braking actuation of said brake system for interrupting said test cycle.

6. The invention defined in claim 1 wherein said second valve means comprises a pair of like, two-position, normally open valves connected in parallel between said resetting chamber and said reservoir, and said test means includes means for cycling one or the other of said pair of valves between its open and closed positions.

* * * * *